United States Patent [19]
Lowery et al.

[11] Patent Number: 6,148,068
[45] Date of Patent: Nov. 14, 2000

[54] SYSTEM FOR MANAGING AN AUDIO CONFERENCE

[75] Inventors: Teddy Blaine Lowery; Richard Lewis Johnson, Jr., both of Wake Forest; Mark Joseph McIntee; Patrick Michael O'Shaughnessey, both of Chapel Hill, all of N.C.

[73] Assignee: Nortel Networks Limited, Canada

[21] Appl. No.: 08/954,468

[22] Filed: Oct. 20, 1997

[51] Int. Cl.[7] .................................................. H04M 3/42
[52] U.S. Cl. .......................................... 379/202; 379/204
[58] Field of Search .................................. 379/202, 206, 379/204, 205

[56] References Cited

U.S. PATENT DOCUMENTS

5,758,079  5/1998  Ludwig et al. ..................... 379/202 X
5,802,294  9/1998  Ludwig et al. ......................... 379/202

*Primary Examiner*—Creighton Smith
*Attorney, Agent, or Firm*—Finnegan, Henderson, Farabow, Garrett & Dunner, L.L.P.

[57] ABSTRACT

An audio conference system includes an audio telephone connection and a separate network computer connect. In arranging a conference with the audio conference system, a conference time and potential participants are designated. At the conference time, the audio conference system directs the public switched telephone network to place a telephone call to each of the potential participants and sends an invitation to a computer systems associated with the potential participants regarding the audio conference. The potential participants then return an indication of whether they desire to be audio conference participants and computer conference participants. If so, the audio conference system will send each computer participant display data with information about the audio conference including who is participating in the conference. Additional display data may also be included such as documents that are to be discussed during the conference.

60 Claims, 8 Drawing Sheets

EDIT MASTER PARTICIPANT & GROUP LIST

MASTER GROUP LIST

NSP TEAM

MASTER PARTICIPANT LIST — 410

ROBERT BROWNE
LAB COMPAQ
BILLY DAIRYMPLE
CARLING HP
LAB IRIX
RICK JOHNSON
RICK JOHNSON-HOME
TED LOWERY
MARK MCINTEE HOME
MARK MCINTEE LAB-1
MARK MCINTEE LAB-2

SORT BY: LAST NAME

[EDIT] [DUPLICATE] [DELETE]

[NEW PARTICIPANT] [NEW GROUP]

[DONE]

*FIG. 4*

| | NEW CONFERENCE | |
|---|---|---|
| TITLE: | NSP TEAM MEETING — 510 | |
| DATE: | NOVEMBER ▽  18 ▽  1996 ▽ | |
| START TIME: | 9 ▽  00 ▽  AM ▽ | — 520 |
| END TIME: | 11 ▽  00 ▽  AM ▽ | |

MASTER PARTICIPANT LIST    INVITED PARTICIPANTS

GROUP: NSP TEAM
ROBERT BROWNE
LAB COMPAQ
CARLING HP

BILLY DAIRYMOLE
RICK JOHNSON-HOME
TED LOWERY
MARK MCINTEE HOME     — 530

EDIT MASTER LIST...

AGENDA:

1. REVIEW ACTIONS FROM PREVIOUS MEETING
2. UPDATES ON PROJECT MILESTONES
3. OPEN DISCUSSION     — 540

REVIEW MATERIALS

NSP PROJECT INFORMATION
HTTP://47.192.3121:8080/NSP/PROJECTS/     — 550

| EDIT URL | DELETE URL | OPEN URL | |
|---|---|---|---|
| URL TITLE: | | | |
| URL LOCATION: | | | ADD URL |
| SAVE | CANCEL | | |

*FIG. 5*

CONFERENCE INVITATION

YOU HAVE BEEN INVITED TO JOIN THE FOLLOWING CONFERENCE:

CONFERENCE          NSP TEAM MEETING

TIME                03:30PM-05:00PM

AUDIO BRIDGE NUMBER 2942403

INVITED PARTICIPANTS RICK JOHNSON-HOME

[JOIN]                                [DECLINE]

| CONFERENCE | WEB CONFERENCE CONTROL PANEL |
|---|---|
| CONFERENCE | NSP TEAM MEETING |
| TIME | 03:30PM-05:00PM |
| AUDIO BRIDGE NUMBER | 2942403 |

| NAME | DISPOSITION | AUDIO STATUS | WEB STATUS | AUDIO CONTROL |
|---|---|---|---|---|
| FLICK JOHNSON-HOME | ALERT ▽ | ○ ON | ○ ON | AUDIO OFF |
| PAT O-SHAUGNDSSEY @HOME | UNKNOWN | ○ ON | ○ OFF | AUDIO OFF |
| OFF NOTION | DECLINED AUDIO | ○ OFF | ○ OFF | AUDIO OFF |
| UNKNOWN@5283950 | UNKNOWN | ○ ON | ○ OFF | AUDIO OFF |

ADD PARTICIPANT | LEAVE CONFERENCE — 760

AGENDA
1. REVIEW ACTIONS FROM PREVIOUS MEETING
2. UPDATES ON PROJECT MILESTONES
3. OPEN DISCUSSION

REVIEW MATERIALS AND SENT URL ☐ AUTO-LOAD

NSP PROJECT INFORMATION
HTTP://47.192.3121:8080/NSP/PROJECTS/

URL TITLE
URL LOCATION                                    SEND

710 — CONFERENCE / TIME
720 — AUDIO BRIDGE NUMBER
730 — (participant list)
770 — ADD PARTICIPANT
740 — AGENDA
750 — URL INFO

FIG. 8

SYSTEM FOR MANAGING AN AUDIO CONFERENCE

BACKGROUND OF THE INVENTION

1. Field of the Invention

This invention generally relates to audio telephone conferences, and more particularly to managing an audio conference in which some participants have both an audio connection and a computer interface that displays information about the conference call.

2. Description of the Related Art

Audio conferences are often used as an effective and easy way of communicating in a business meeting. However, there are many things that may be communicated by visual cues during a face-to-face meeting that must be communicated with an audio indicator during an audio conference. The lack of visual communication and the need for extra audio indicators seriously impacts the productivity of an audio conference.

Typically, at the beginning of an audio conference, all of the participants are connected at the same time. If another person then later joins the meeting there must be some audio indication that someone else has joined to allow the others to know who is in the meeting. The person that has joined the meeting may ask "who else is here" in order to determine to whom they are speaking. One existing audio conference system, sounds a tone when someone enters or leaves a conference, prompting the other participants to ask "Who left?" or "Who entered?" In addition, if a participant decides to leave the conference or reenter the conference, there must be an audio indication of this.

During the conference there may be a discussion concerning documents or graphical materials that all of the participants do not possess. It may be desirable to share these documents with all participants. Often this material is either pre-sent to the participants or sent after the meeting, but is not typically received during the meeting.

A further problem in audio conferences is the need to balance the voice levels of the participants. For example, some participants may have phones that produce a higher volume, while others may use speaker phones that produces a great deal of background noise, and it would be desirable to be able to change signal volumes of individual participants.

SUMMARY OF THE INVENTION

Systems and methods consistent with the present invention include steps and structure for setting up an audio conference by sending a message via an audio system and via a computer system to potential conference participants regarding an audio conference. The potential conference participants then return an indication of whether they desire to be audio conference participants and computer conference participants. If so, the audio conference system will send each computer participant display data with information about the audio conference including who is participating in the conference.

Additional display data may be passed by participants to each of the other participants in the audio conference on their computer system. The audio conference system can also maintain a status of the audio conference by adding display data to reflect that another participant has entered the audio conference or by indicating that a participant has a disconnected telephone.

BRIEF DESCRIPTION OF THE DRAWINGS

The accompanying drawings, which are incorporated in and constitute a part of this specification, illustrate embodiments of the invention and, together with the description, serve to explain the advantages and principals of the invention. In the drawings.

DETAILED DESCRIPTION OF THE PREFERRED EMBODIMENTS

Reference will now be made in detail to the construction and operation of preferred implementations consistent with the present invention that are illustrated in the accompanying drawings. The following description of the present invention is only exemplary. The present invention is not limited to these implementations, but may be realized by other implementations.

Figure 1:
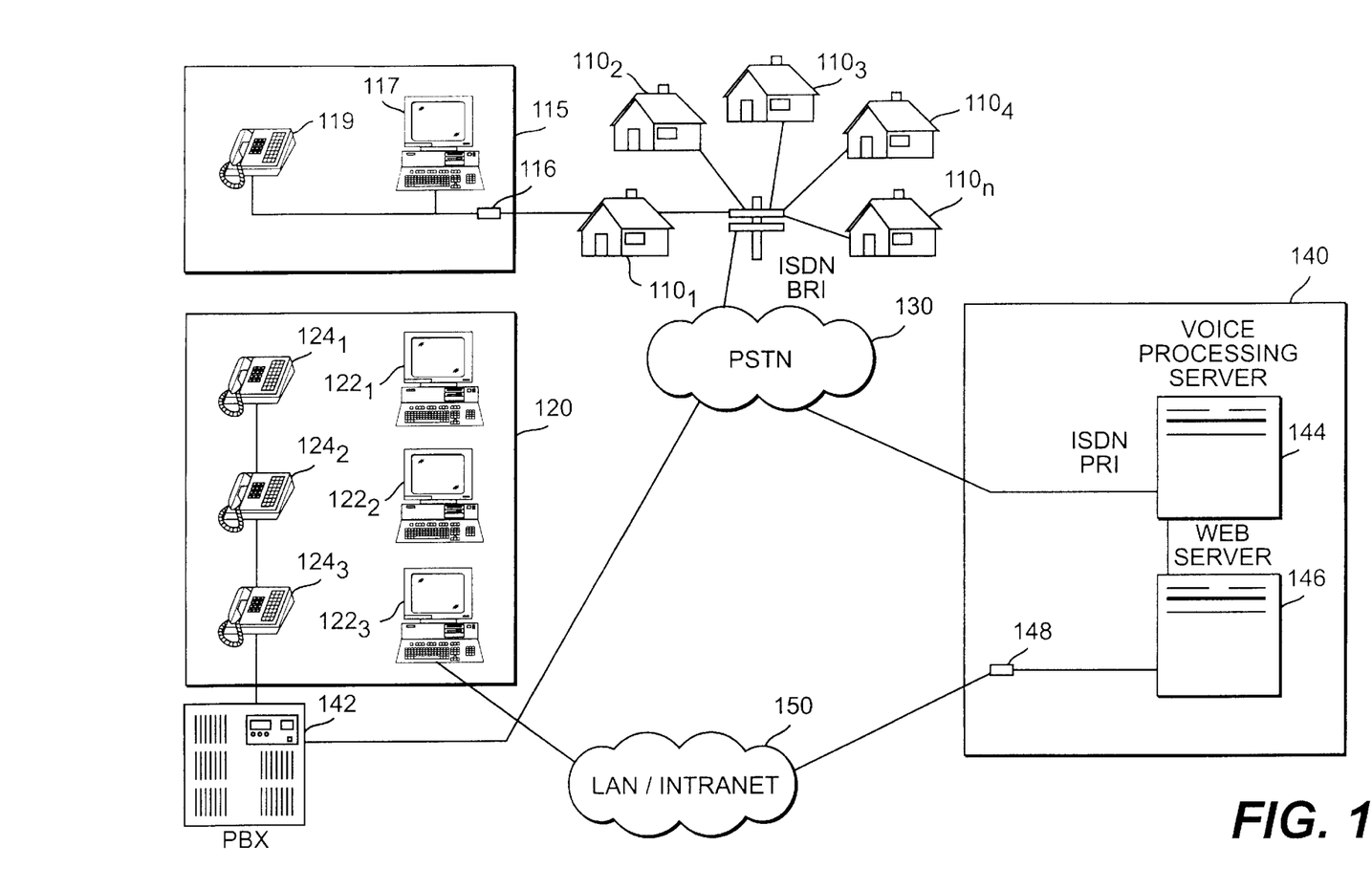
FIG. 1 is an overall system diagram of an embodiment of the present invention.

FIG. 1 illustrates one implementation consistent with the present invention. FIG. 1 shows a plurality of individual user sites $110_1$–$110_n$ and a group site 120 with a plurality of additional user sites, $122_1$–$122_3$. As shown in block 115, each participant site $110_1$–$110_n$ includes a connection interface 116 through which its telephone 119 and its computer system 117 communicate with a public switched telephone network (PSTN) 130 in a conventional manner. The connection interface 116 is preferably a read always connection such as an ISDN allowing outside communication to be received at any time. PSTN 130 in turn communicates with a local communication site 140. The conference controller 140 includes a voice processing server 144, web server 146, and an interface 148. The interface 148, such as an Ethernet interface, allows communication between the web server 146 and a local area network/distributed network (LAN/Intranet) system 150 which communicates with outside computer terminals such as terminals $122_1$–$122_3$.

Private branch exchange (PBX) 142 is a conventional device used to oversee telephone communications at a specific site. PBX 142 acts as an interface between the PSTN 130 and the group of users $124_1$–$124_3$ to receive telephone communications from PSTN 130. The voice processing server 144 processes received telephone communications and in turn communicates with the PSTN 130 via known standards, such as an Services Digital Network Primary Rate Interface (ISDN PRI).

Figure 2:
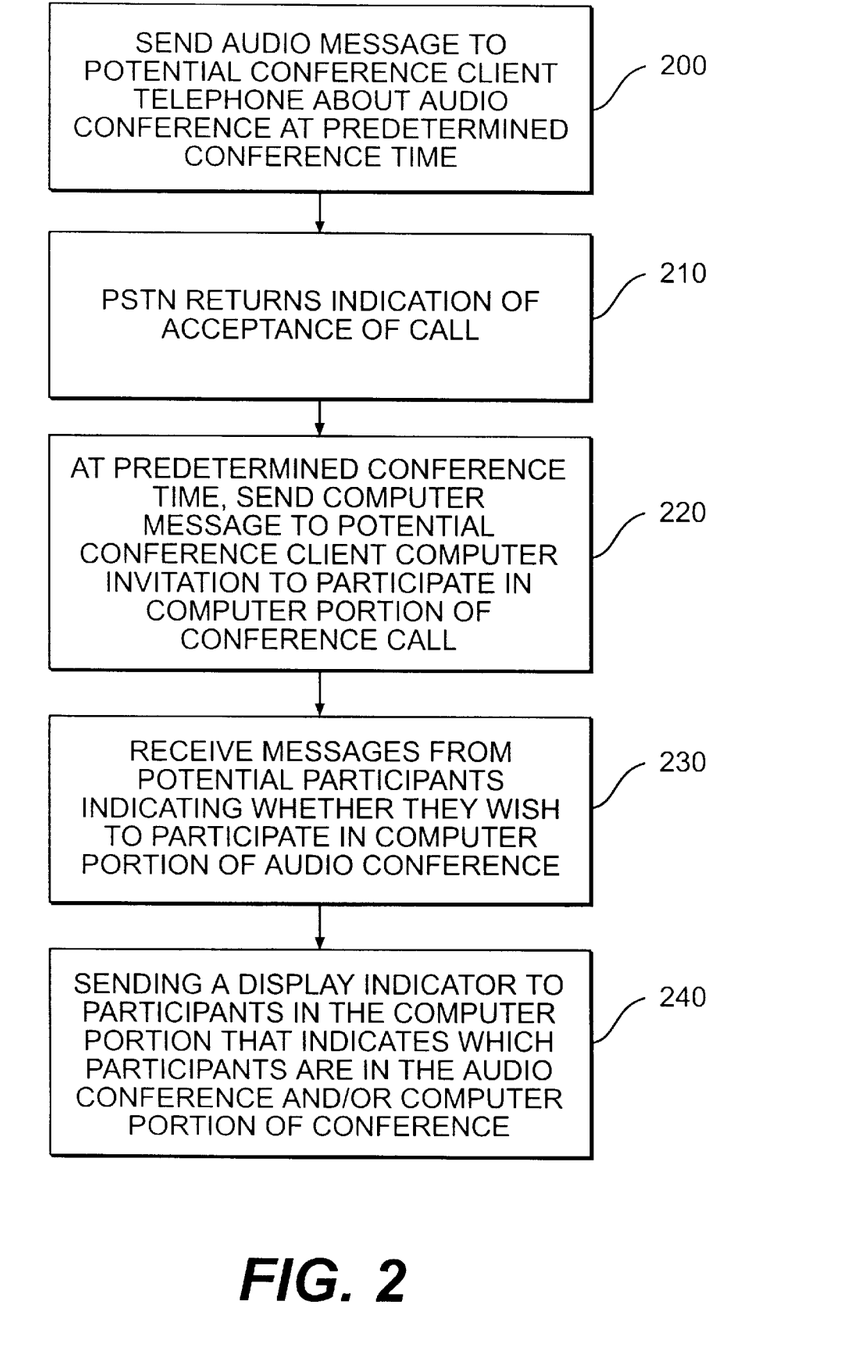
FIG. 2 is a flow chart, showing the steps for setting up and carrying out a conference call according to the present invention.

FIG. 2 is a flow chart of the steps for organizing a conference call. Voice processing server 144 and web server 146 include processors for performing the procedure shown in FIG. 2. The voice processing server 144 directs PSTN 130 to call potential participants to the audio conference at a set conference time (step 200). After PSTN 130 calls the individuals, it returns an indication to the voice processing server 144 indicating whether the calls were answered and accepted (step 210). For example, a message may state "press 1 to participate in telephone conference, press 2 or hang up to decline."

Voice processing server 144 directs the web server 146 to invite potential conference participants to participate in the computer portion of the conference. Web server 146 sends invitations to the web portion of the conference at the same time that the voice processing server 144 sends audio invitations to the participants telephones. The time for sending the invitations is the designated conference time previously sent by the person organizing the conference. Web server 146 communicates through interface 148 and LAN/Intranet 150 to individual computer sites $122_1$–$122_3$ and through PSTN 130 to individual computer sites 117, and sends an invitation to potential participants at the designated conference time inviting the users to participate in the computer portion of the audio conference (step 220). The participants respond with a computer message indicating whether they wish to participate in the computer portion of the conference (step 230).

Voice processing server 144 sends a display indicator to participants indicating that a specific participant has answered the telephone and is participating in the telephone conference and/or in the computer portion of the conference (step 240). This display indicator would be passed through the telephone system to reach the computer system participants 110, and through the LAN/Intranet 150 to reach the computer system participants within group site 120.

Figure 3:
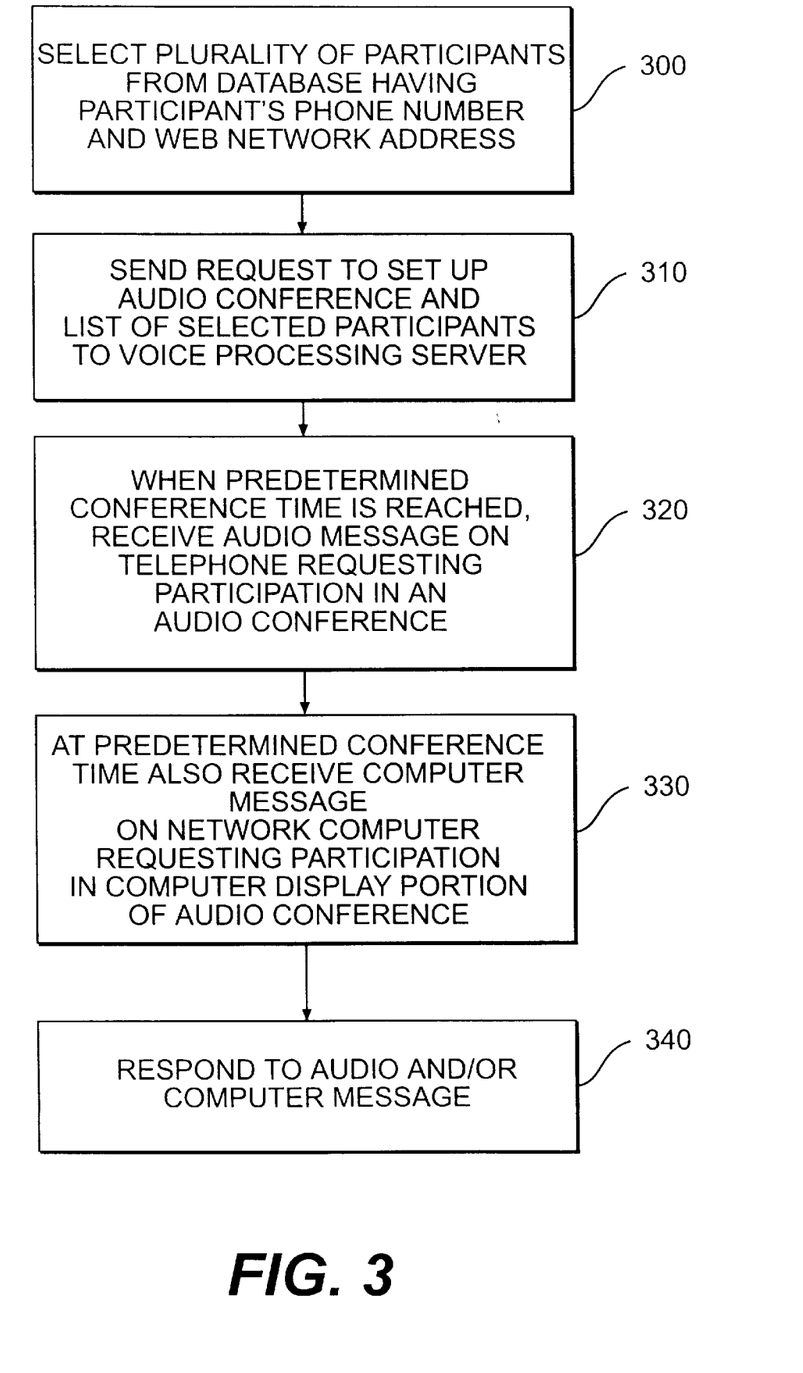
FIG. 3 is a flow chart showing the steps an individual participant takes to set up and maintain an audio conference according to the present invention.

FIG. 3 is a flowchart showing the steps performed by a participant in setting up and entering into an audio conference. To set up a conference, a participant sends information to the web server 146 through a computer to either LAN/Intranet 150 or PSTN 130. The participant may alternatively set up the conference through an operator who in turn sends the necessary information to the communication site 140. To set up a conference, basic conference information such as participants' names, numbers, and computer addresses must be entered or selected from a database (step 300). For convenience, a participant can maintain a database that includes a listing of potential conference participants, their phone numbers and computer addresses.

Figure 4:
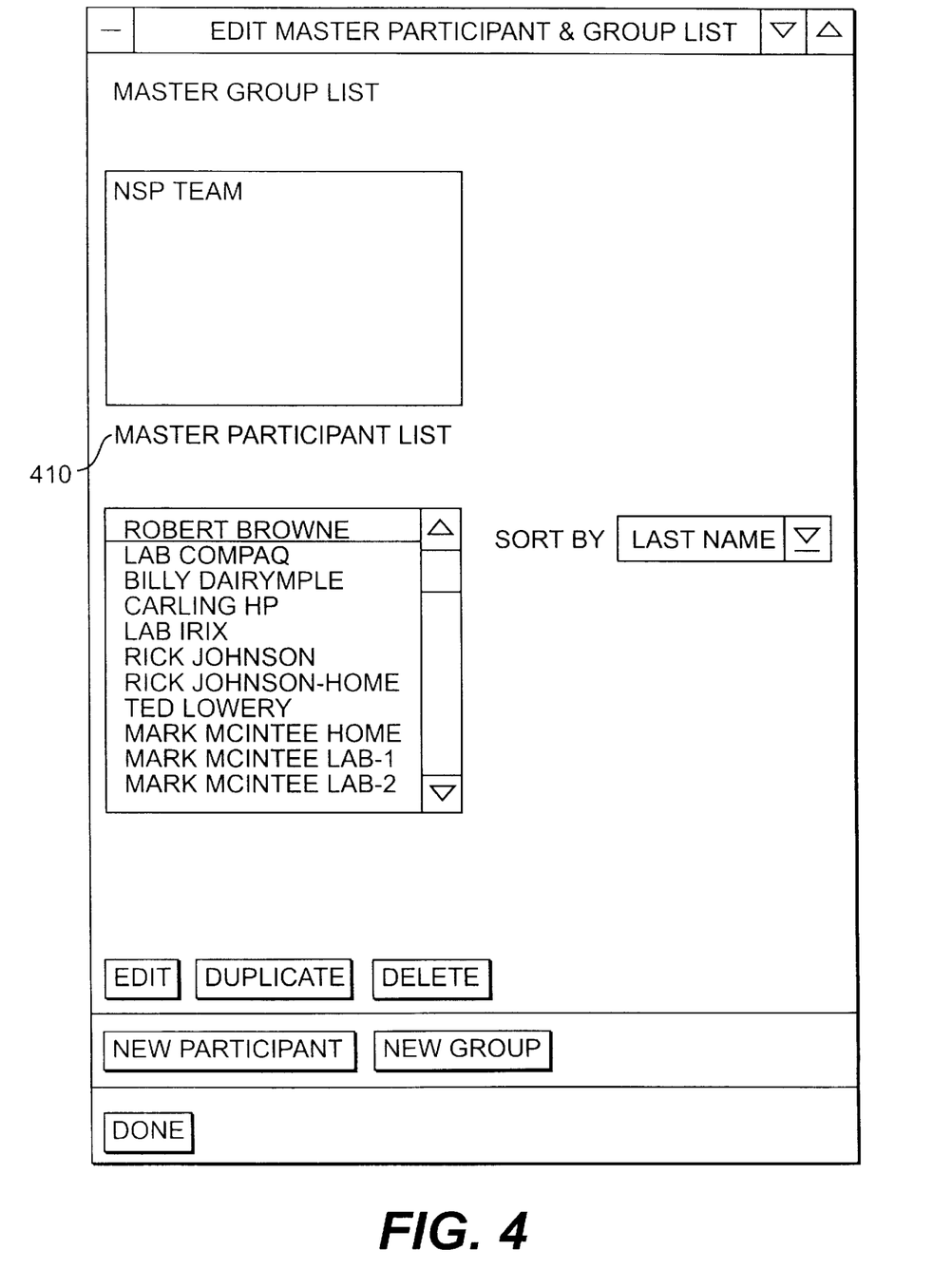
FIG. 4 is an exemplary screen for listing potential participants and selecting participants.
Figure 5:
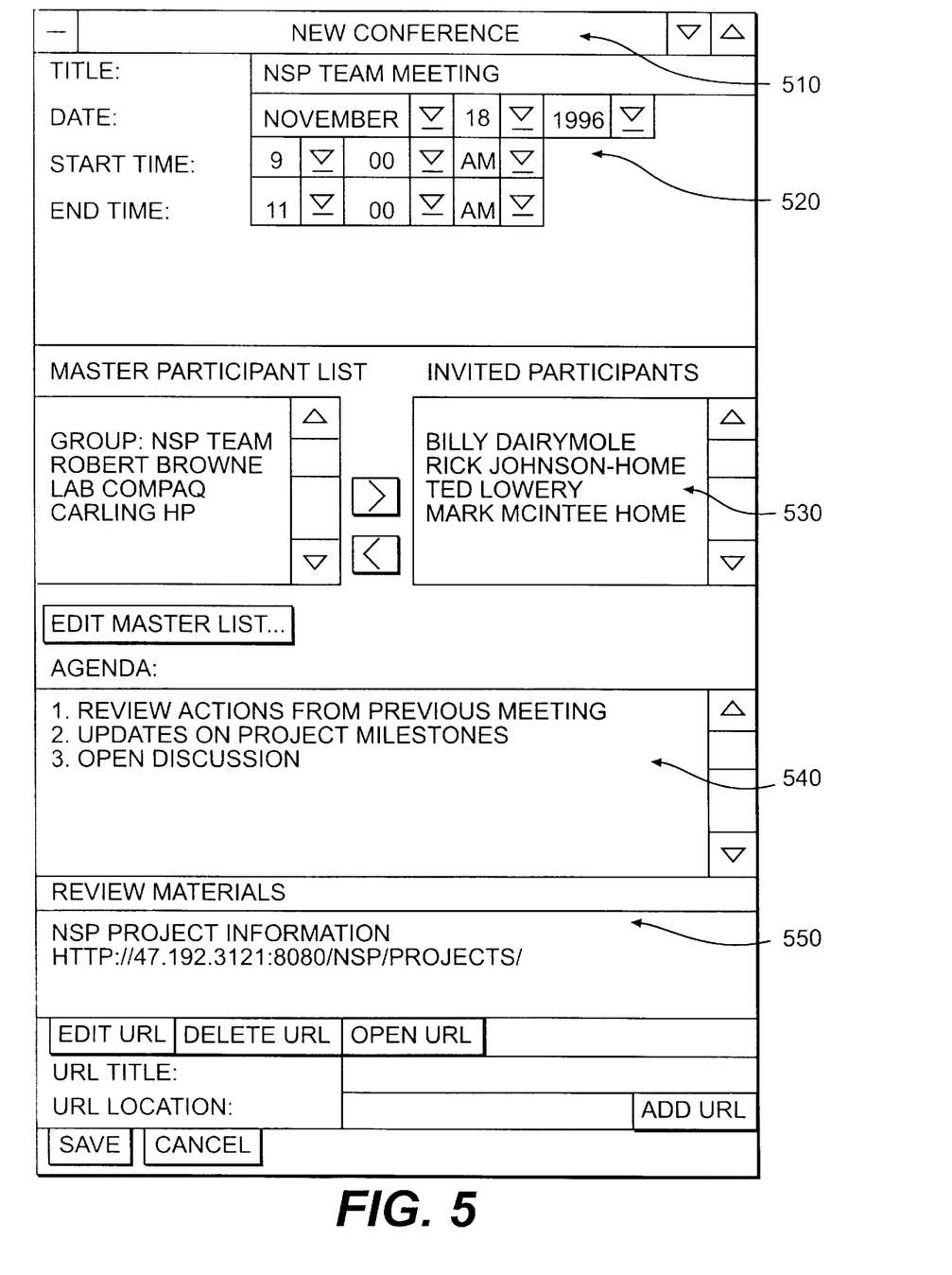
FIG. 5 is an exemplary screen utilized by a participant to create a new audio conference or to view information about an audio conference.

FIG. 4 illustrates an exemplary screen utilized by a participant to select potential audio conference participants from a master participant list 410. FIG. 5 illustrates a conference request display that includes fields such as title 510, time 520, invited participants 530, agenda 540, and attached conference materials 550. After providing information about the conference, the request is sent over the LAN/Intranet 150 to web server 146 and voice processing server 144 (step 310).

After the conference is set up, and at the scheduled time of the audio conference, each invited participant will receive an audio telephone message inviting them to participate in the audio conference (step 320). An invitation to participate is also received at each participant's computer at the predetermined conference time (step 330).

Figure 6:
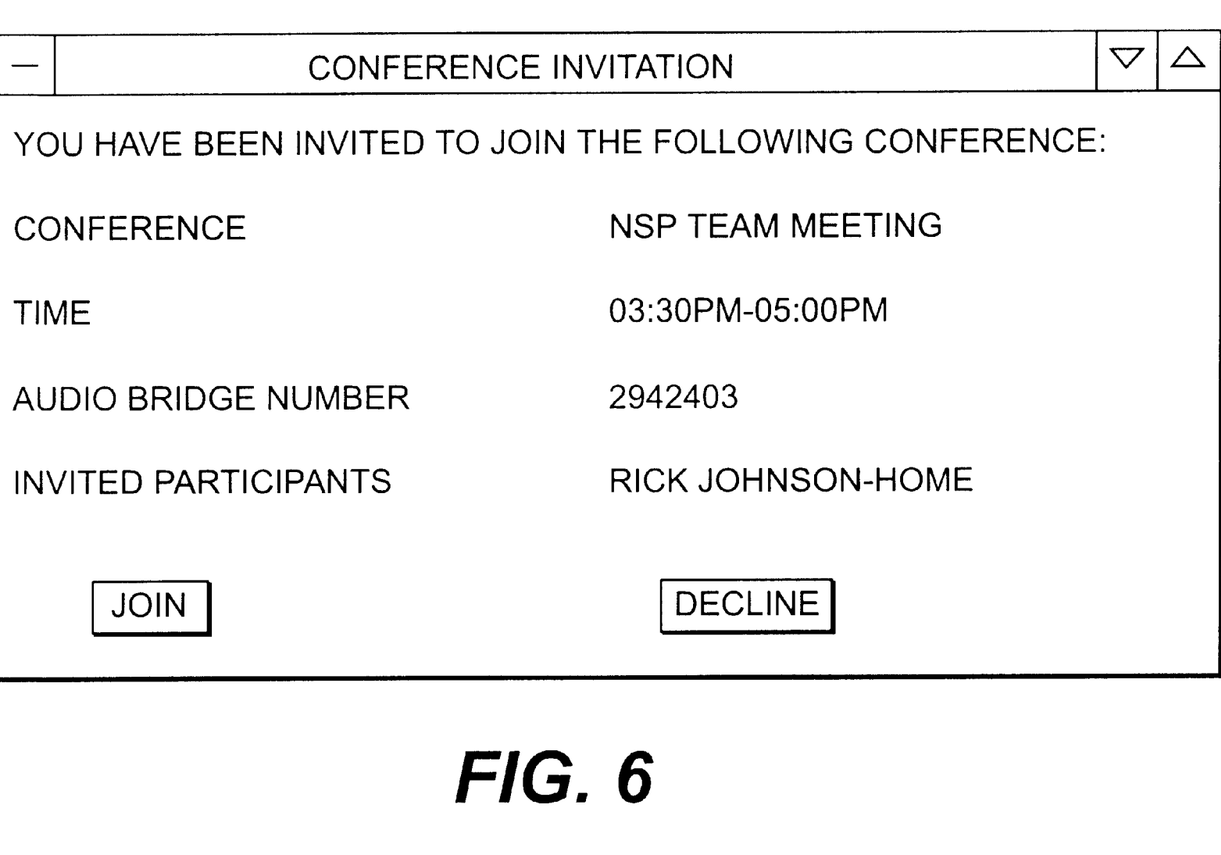
FIG. 6 is an example of a screen displayed during an audio conference according to the present invention.

FIG. 6 shows an exemplary computer screen displaying conference invitation including the title of the conference 610, time of the conference 620, and names of the invited participants 630. The invited participants may select to join the conference or decline to join the conference. The responses to this message are returned to the web server 146 via either the PSTN 130, or the LAN/Intranet 150. Users respond to both invitations, e.g., by sending a computer response or by answering the telephone (step 340).

Figure 7:
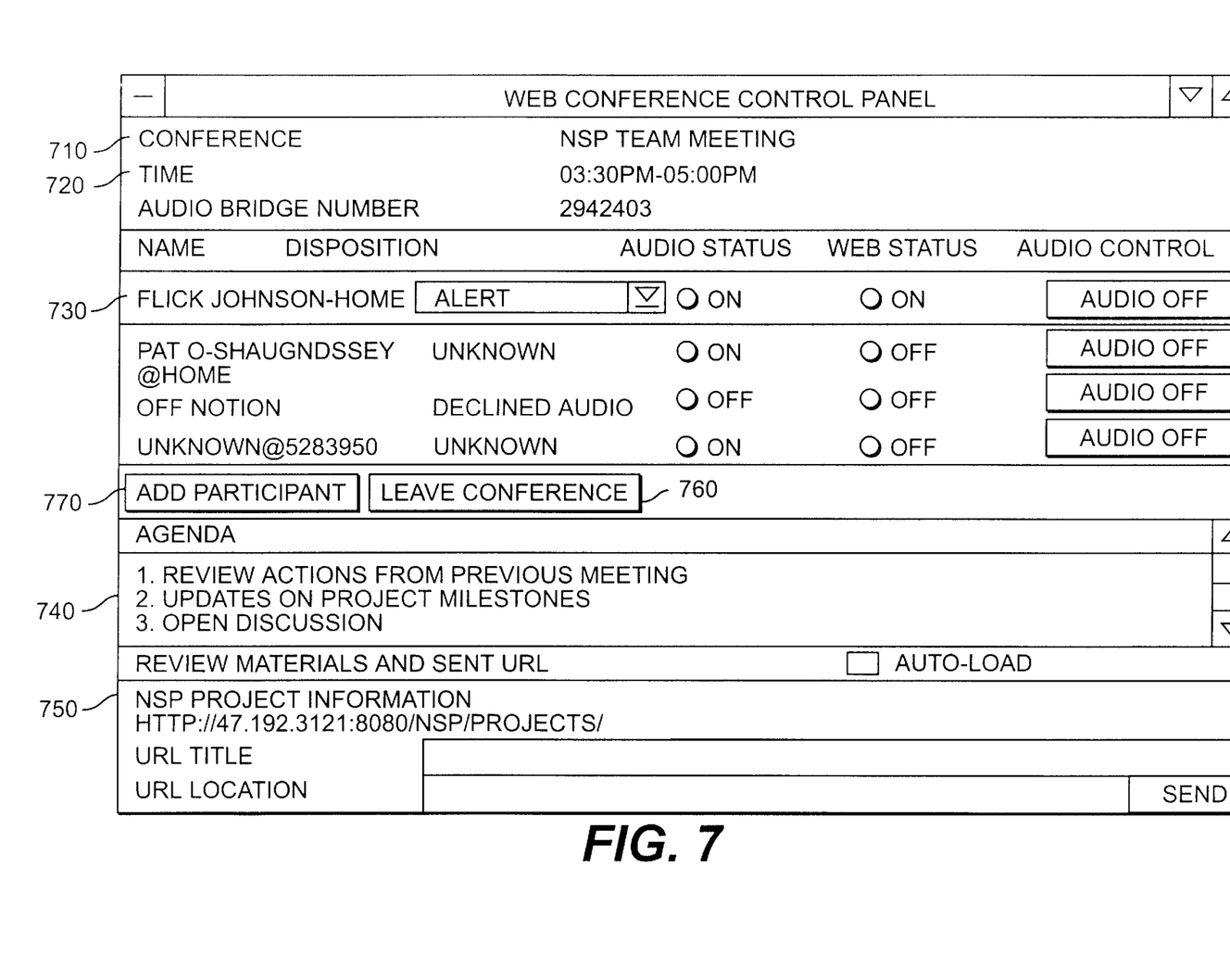
FIG. 7 is an example of a conference control panel according to the present invention.

FIG. 7 illustrates an exemplary conference control panel display that each participant can view. The conference control panel display allows the users to input commands that are relayed to the web server 146. This includes information such as the title of the conference 710, the conference time 720, and the participants' names and whether they are participating in the audio and/or computer portion of the conference 730. A control panel includes controls allowing a participant to change the volume of any one of the other participants or mute one of the other participants. Preferably, only a single conference participant may mute another participant from being heard by anyone. A conference agenda is shown in field 740. A list of document-type material that has been sent over the LAN/Intranet 150 to the participants is shown in field 750.

Figure 8:
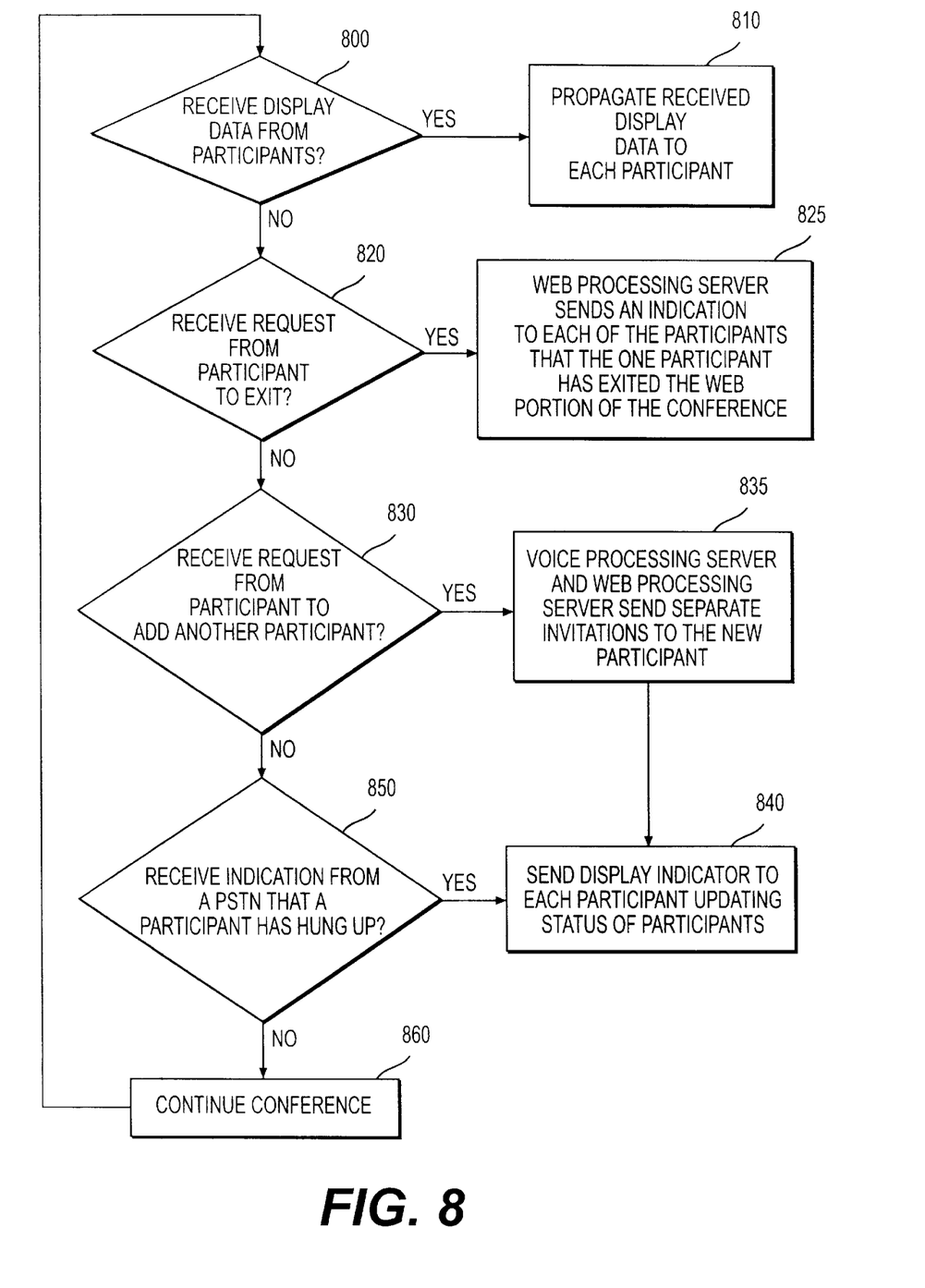
FIG. 8 is a flow chart showing additional processing steps performed by a voice processing and web server.

Participants may exchange additional documents over the computer network during a conference. FIG. 8 shows additional processing steps performed by the voice processing server 144 and web server 146. Web server 146 receives new document or display data (step 800) and propagates the received data to each of the participants in the computer portion of the conference (step 810).

During a conference, a participant may desire to exit or invite another participant to enter the conference. FIG. 7 shows buttons allowing participants to indicate they are leaving 760 the conference or requesting the system to add another participant 770. When web processing server 146 receives a request to exit (step 820), the web processing server 146 and instructs the voice processing server 144 to disconnect the exiting participant and send an indication to each of the participants that the participant has exited the web portion of the conference (step 825). When the web processing server 146 receives a request from a participant to add another participant (step 830), server 146 and voice processing server 144 both invite the new participant in the same manner that the original participants were invited (step 825). Display data is sent to the participants indicating whether the newly invited participant answered the telephone invitation and whether the participant accepted the computer conference invitation (step 840).

When a participant hangs up, PSTN 130 sends an industry standard "on hook" indication to the voice processing server 144 (step 850). The voice processing server 144 then instructs web processing server 146 to send a display indicator to each participant updating the status of participants (step 840). The conference continues until time is up for the conference or all participants disconnect (step 860).

Systems and methods consistent with the present invention allow an audio telephone conference to be set up automatically and to include a computer connection between parties wishing to share information and view information about the audio conference. The systems and methods also allow participants to view who is participating in the conference and whether they are still connected to the conference. They also allow participants to share documents, charts, and agenda information.

Persons of ordinary skill in the art will recognize that various modifications and variations can be made in the systems and methods consistent with the present invention without departing from the scope or spirit of the invention. Other embodiments will be apparent to those skilled in the art from consideration of the specification and practice of the invention. The specification and examples are only exemplary. The true scope and spirit of the invention is indicated by the following claims.

What is claimed is:

1. A system for setting up an audio conference comprising:
   means for sending a message to potential participants in an audio conference;
   means for receiving messages from actual ones of the potential conference participants, indicating a desire to be conference participants; and
   means for sending display data to the actual conference participants with information about the audio conference and without video information of the actual conference participant, wherein the display data includes at least one of the following: at least one name of the actual participants, audio conference title, audio conference time, conference agenda, and statuses of communication connections to each of the actual participants.

2. The system according to claim 1 wherein the means for sending a message includes:
   means for sending a message at a predetermined time.

3. The system according to claim 1, further including
   means for receiving additional display data from one of the actual participants; and
   means for propagating the additional display data to all of the actual participants.

4. The system according to claim 1, further including
   means for receiving a message from a public telephone server indicating that one of the participants has disconnected their telephone; and
   means for adding an indicator to the display data that a particular participant is no longer participating in the audio conference.

5. The system according to claim 1, further including:
   means for receiving an indication from one of the participants in the conference that an additional participant should be invited; and
   means for connecting the additional participant to the ongoing audio conference.

6. The system according to claim 1, further including:
   means for receiving an indication of whether a particular one of the participants is connected to a computer interface; and
   means for propagating a display indicator to each of the actual participants in the audio conference showing whether the particular participant is connected to the computer interface.

7. The system according to claim 1 wherein the means for sending a message includes:
   means for sending messages to a public telephone server directing the server to call each participant in the audio conference;
   means for receiving an indication from the server that the call was answered by a corresponding participant; and
   means for sending a display indicator to each of the actual conference participants indicating that the corresponding participant has answered the call.

8. The system according to claim 7 wherein the means for sending messages includes:
   means for receiving a message listing the actual participants and associated telephone numbers.

9. The system according to claim 8, wherein the means for sending messages to the public telephone server includes:
   means for reading a telephone number for each potential participant in the video conference; and
   means for forwarding the read telephone numbers to the public telephone server.

10. The system according to claim 1, wherein a selected one of the actual conference participants has access to a conference control panel that allows the selected actual conference participant to output a mute command for a designated one of the actual conference participants, the system further including:
    means for receiving a mute command, and
    means for muting the audio sounds of the designated conference participant.

11. A system for setting up an audio conference comprising:
    a sending element configured to send a message to potential conference participants regarding an audio conference;
    a receiving element configured to receive messages from actual ones of the potential conference participants indicating a desire to be conference participants; and
    a transmitting element configured to transmit display data to the actual conference participants with information about the audio conference and without video information of the actual conference participants, wherein the display data includes at least one of the following: at least one name of the actual participants, audio conference title, audio conference time, a conference agenda, and statuses of communication connections to each of the actual participants.

12. The system according to claim 11 wherein the sending element includes a sub-element configured to send a message at a predetermined time.

13. The system according to claim 11, further including:
    a second receiving element configured to receive additional display data from one of the actual participants; and
    a propagation element configured to propagate the additional display data to all of the actual participants.

14. The system according to claim 11, further including:
    a second receiver element configured to receive a message from a public telephone server indicating that one of the actual participants has disconnected their telephone; and
    an indication element configured to add an indicator to the display data propagated to participants that the particular participant is no longer participating in the audio conference.

15. The system according to claim 11, further including:
    a second receiving element configured to receive an indication from one of the actual participants in the conference that an additional participant should be invited to participate; and
    a connector configured to connect the additional participant to the ongoing audio conference.

16. The system according to claim 11, further including:
    a second receiving element configured to receive an indication of whether a particular one of the actual participants is connected to a computer interface; and
    a propagating element configured to propagate a display indicator to each of the actual participants in the audio conference showing whether the particular participant is connected to the computer interface.

17. A system according to claim 11 wherein the sending element includes:
    a second sending element configured to send messages to a public telephone server directing the server to call each participant in the audio conference;

a second receiving element configured to receive an indication from the public telephone server that a call was answered by a corresponding participant; and a second transmitter configured to transmit a display indicator to each of the participants indicating that the specific participant has answered the call.

18. The system according to claim 17 wherein the sending element includes:

a sub-sending element configured to receive messages listing the actual participants and associated telephone numbers.

19. The system according to claim 18, wherein the second sending element includes:

a reading element configured to read a telephone number for each of the potential participants in the video conference; and a forwarding element configured to forward the read phone numbers to the public telephone server.

20. The system according to claim 11, wherein a selected one of the actual conference participants has access to a conference control panel that allows the selected actual conference participant to output a mute command for a designated one of the actual conference participants, the system further including:

a second receiving element configured to receive a mute command, and a muting element configured to mute the audio sounds of the designated conference participant.

21. A method for setting up an audio conference comprising the steps of:

sending a message to potential conference participants regarding an audio conference;

receiving messages from ones of the potential conference participants indicating a desire to be actual conference participants; and sending display data to the other ones of the actual conference participants with information about the audio conference and without video information of the actual conference participants, wherein the display data display data includes at least one of the following: name of the actual participants, conference title, audio conference time, a conference agenda list, and statuses of communication connections to each of the actual participants.

22. The method according to claim 21 wherein the step of sending a message, includes the step of:

sending a message at a predetermined time.

23. The method according to claim 21, further including the steps of receiving additional display data from one of the actual participants; and propagating the additional display data to all of the actual participants.

24. The method according to claim 21, further including the steps of receiving a message from a public telephone server indicating that one of the actual participants has disconnected a corresponding telephone; and adding an indicator to the display data propagated to participants that the particular participant is no longer participating in the audio conference.

25. The method according to claim 21, further including the steps of:

receiving an indication from one of the actual participants in the conference that an additional participant should be invited to participate; and connecting the additional participant to the ongoing audio conference.

26. The method according to claim 21, further including the steps of:

receiving an indication of whether a particular one of the participants is connected to a computer interface; and propagating a display indicator to each of the participants in the audio conference showing whether the particular participant is connected to the computer interface.

27. A method according to claim 21 wherein the step of sending a message includes the steps of:

sending messages to a public telephone server directing the server to call each participant in the audio conference;

receiving an indication from the public telephone server that a call was answered by a corresponding participant; and sending a display indicator to each of the actual conference participants indicating that the corresponding participant has answered the call.

28. The method according to claim 22 wherein the step of sending a message includes the step of:

receiving messages listing the actual participants and associated telephone numbers.

29. The method according to claim 28, wherein the step of sending messages to the public telephone server includes the steps of:

reading a telephone number for each of the potential participants in the video conference; and forwarding the read phone numbers to the public telephone server.

30. The method according to claim 21, wherein a selected one of the actual conference participants has access to a conference control panel that allows the selected actual conference participant to output a mute command for a designated one of the actual conference participants, the method further including the steps of:

receiving a mute command, and muting the audio sounds of the designated conference participant.

31. An audio conferencing system for servicing a plurality of potential conference participants, at least one of the potential conference participants having a computer terminal, the system comprising:

means for determining which ones of the plurality of potential conference participants are active participants in the conference;

means to determine which ones of the active participants have computer terminals connected to a communications network; and means for outputting instructions over a network to the computer terminals of the active participants to display conference data, wherein the conference data does not include video information of the active participants, and wherein the conference data includes at least one of the following: at least one name of the actual participants, audio conference title, audio conference time, a conference agenda, and statuses of communication connections to each of the actual participants.

32. The system according to claim 31 wherein the means for outputting instructions includes means for receiving display data from a computer terminal associated with an active participant, and means for propagating the received display data to each of the computer terminals associated with active participants.

33. The system according to claim 31 further including:
means for calling a plurality of telephones each associated with a different one of the potential conference participants.

34. The system according to claim 31 wherein the means for outputting instructions includes:
means for instructing the computer terminals to display data identifying active participants.

35. The system according to claim 34 wherein the means for determining includes:
means for determining whether a call was answered to determine whether a called party is actively participating in the conference.

36. An audio conferencing system for servicing a plurality of potential conference participants, at least one of the potential conference participants having a computer terminal, the system comprising:
a determining element configured to determine which ones of the plurality of potential conference participants is an active participant actively participating in the conference; and
a second determining element configured to determine which ones of the active participants has a computer terminal connected to a communications network; and
a transmitting unit configured to transmit instructions over the network to processors of the computer terminals of the active participants to display conference data, wherein the conference data does not include video information of the active participants, and wherein the conference data includes at least one of the following: name of the actual participants, conference title, audio conference time, a conference agenda list, and statuses of communication connections to each of the actual participants.

37. The system according to claim 36 wherein the transmitting element includes:
a receiving element configured to receive display data from a computer terminal associated with an active participant, and
a propagation element configured to propagate the received display data to each of the computer terminals associated with active participants.

38. The system according to claim 36 further including:
a calling element configured to call a plurality of telephones each associated with a different one of the potential conference participants.

39. The system according to claim 36 wherein the transmitting element includes:
an instructing element configured to instruct the computer terminals to display data identifying active participants.

40. The system according to claim 39 wherein the determining element includes:
a sub-element configured to determine whether a call was answered.

41. A method for servicing a plurality of potential audio conference participants, at least one of the potential conference participants having a computer terminal, the method comprising the steps of:
determining which ones of the plurality of potential conference participants are active participants actively participating in the conference;
determining which ones of the active participants have computer terminals connected to a communications network; and
outputting instructions over the network to the computer terminals of the active participants to display conference data, wherein the conference data does not include video information of the active participants, and wherein the conference data includes at least one of the following: at least one name of the actual participants, audio conference title, audio conference time, a conference agenda, and statuses of communication connections to each of the actual participants.

42. The method according to claim 41 wherein the step of outputting instructions includes the steps of:
receiving display data from a computer terminal associated with an active participant, and
propagating the received display data to each of the computer terminals associated with active participants.

43. The method according to claim 41 further including the step of:
calling a plurality of telephones each associated with a different one of the potential conference participants.

44. The method according to claim 41 wherein the step of outputting instructions includes the step of:
instructing the computer terminals to display data identifying active conference participants.

45. The method according to claim 44 wherein the step of determining includes the step of:
determining whether a call was answered to determine whether a called party is actively participating in the conference.

46. A system for use in an audio conference having a plurality of participants comprising:
means for receiving a message regarding an audio conference;
means for sending a reply message regarding the audio conference to a conference controller; and
means for receiving and presenting display data with information about the audio conference, wherein the display data does not include video information of the plurality of participants, and wherein the display data includes at least one of the following: at least one name of the actual participants, audio conference title, audio conference time, a conference agenda, and statuses of communication connections to each of the actual participants.

47. The system according to claim 46 further including
means for receiving a telephone call through a public telephone server in order to participate in the audio conference; and
means for answering the telephone call.

48. The system according to claim 46 further including:
means for altering information in the display data and
means for sending the altered information to other ones of the participants in the audio conference.

49. The system according to claim 46 further including:
means for muting the audio output of at least one of the other ones of the participants.

50. The system according to claim 46 further including:
means for separately adjusting a volume of each of the participants.

51. A system for use in an audio conference having a plurality of participants comprising:
a receiving element configured to receive a message regarding an audio conference;
a sending element configured to send a reply message regarding the audio conference to a conference controller; and
a second receiving element configured to receive and present display data with information about the audio conference, wherein the display data does not include video information of the plurality of participants, and wherein the display data includes at least one of the following: at least one name of the actual participants, audio conference title, audio conference time, a conference agenda, and statuses of communication connections to each of the actual participants.

52. The system according to claim 51 further including:

a third receiving element configured to receive a telephone call through a public telephone server in order to participate in the audio conference; and an answering element configured to answer the telephone call.

53. The system according to claim 51 further including:

an altering element configured to alter information in the display data; and second sending element configured to send the altered information to other ones of the participants in the audio conference.

54. The system according to claim 51 further including:

muting element configured to mute the audio output of at least one of the other ones of the participants.

55. The system according to claim 51 further including:

an adjusting element for separately adjusting a volume of each of the participants.

56. A method of conducting an audio conference having a plurality of participants comprising the steps of:

receiving a message regarding an audio conference;

sending a reply message regarding the audio conference to a conference controller;

receiving display data; and presenting display data with information about the audio conference, wherein the audio conference does not include video information of the plurality of participants, and wherein the display data includes at least one of the following: at least one name of the actual participants, audio conference title, audio conference time, a conference agenda, and statuses of communication connections to each of the actual participants.

57. The method according to claim 56 further including the steps of:

receiving a telephone call through a public telephone server in order to participate in the audio conference; and answering the telephone call.

58. The method according to claim 56 further including the steps of:

altering information in the display data; and means for sending the altered information to other ones of the participants in the audio conference.

59. The method according to claim 56 further including the step of:

muting the audio output of at least one of the other ones of the participants in the audio conference.

60. The method according to claim 56 further including the step of: separately adjusting a volume of each of the participants.

* * * * *